United States Patent
Bottomley et al.

(10) Patent No.: US 8,179,988 B2
(45) Date of Patent: May 15, 2012

(54) CYCLIC REDUNDANCY IN ODFM SYSTEMS (75) Inventors: Gregory E. Bottomley, Cary, NC (US); Leif R. Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 954 days.

(21) Appl. No.: 12/278,186

(22) PCT Filed: Feb. 3, 2006

(86) PCT No.: PCT/SE2006/000161
§ 371 (c)(1),
(2), (4) Date: Aug. 4, 2008

(87) PCT Pub. No.: WO2007/089180
PCT Pub. Date: Aug. 9, 2007

(65) Prior Publication Data
US 2009/0010352 A1 Jan. 8, 2009

(51) Int. Cl.
*H04J 11/00* (2006.01)
*H04L 27/26* (2006.01)
(52) U.S. Cl. ........................ 375/260; 375/324
(58) Field of Classification Search .................. 375/343, 375/348, 350, 260, 326, 316, 324; 370/210, 370/203, 208
See application file for complete search history.

(56) References Cited

U.S. PATENT DOCUMENTS

| | | | |
|---|---|---|---|
| 6,618,452 B1 * | 9/2003 | Huber et al. ................... 375/343 |
| 7,016,651 B1 * | 3/2006 | Narasimhan ............... 455/67.11 |
| 7,545,891 B1 * | 6/2009 | Pare et al. ..................... 375/344 |
| 2003/0026360 A1 * | 2/2003 | Ramasubramanian et al. ............................. 375/343 |
| 2004/0091058 A1 * | 5/2004 | Tosato et al. ................... 375/261 |
| 2006/0239367 A1 * | 10/2006 | Wilhelmsson et al. ....... 375/260 |
| 2008/0304585 A1 * | 12/2008 | Song ............................ 375/260 |

OTHER PUBLICATIONS

Zhigang Zhou, Shixin Cheng, Ming Chen and Haifeng Wang, "An Improved Channel Estimator with Real-Time ISI Free Window Tracking for OFDM Systems", National Mobile Communication Research Lab, Southeast University, China and Nokia, 2004, IEEE.*
Karthik Ramasubramanian and Kevin Baum, "An OFDM Timing Recovery Scheme with Inherent Delay-Spread Estimation", Motorola Labs, IEEE, 2001.*
Bottomley, G.E and Wilhelmsson, L.R., "Recycling the Cyclic Prefix in an OFDM System", Ericsson Research, IEEE, Sep. 2006.*

* cited by examiner

*Primary Examiner* — Aristocratis Fotakis (57) ABSTRACT

Method, communication system, receiver, baseband processor and computer program for recovering data from a received OFDM-signal containing recurrent redundant information where part of the recurrent redundant information is used to maximize the SINR (Signal to Interference plus Noise Ratio) of the received OFDM-signal.

11 Claims, 3 Drawing Sheets

CYCLIC REDUNDANCY IN ODFM SYSTEMS

TECHNICAL BACKGROUND

The present invention is related to a method and a system for processing and receiving OFDM-signals using a cyclic prefix (CP).

BACKGROUND OF THE INVENTION

Orthogonal Frequency Division Multiplexing (OFDM) is a promising approach for transmitting digital symbols through a dispersive channel. It has already been adopted for Digital Video Broadcast (DVB) in Europe as well as for WLAN standards like IEEE 802.11a and 802.11g. It will most likely be used in Super 3G, the evolution of Wideband CDMA (WCDMA), as well as 4G digital cellular.

The basic idea with OFDM is to send symbols in parallel, on different carrier frequencies or "tones." Modulation is performed on blocks of symbols, using an inverse fast Fourier transform (IFFT). Then, for each block, a portion of the end of the block is copied and pre-appended to the block as is described in the document "Data transmission by frequency division multiplexing using discrete Fourier transform", by S. B. Weinstein and P. M. Ebert, IEEE Trans. Commun. vol. COM-19, pp. 628-634, October 1971. This copy is known as the cyclic prefix (CP). The signal is transmitted through a potentially dispersive channel. As a result, multiple images of the transmitted signal with different delays are superimposed at the receiver. A traditional OFDM receiver discards the CP. This removes interblock interference much as a guard interval would. It also preserves the orthogonality of the tones in the remaining data. The remaining data is passed through an FFT, recovering the data symbols. The CP has an overhead cost in symbol energy, as this portion of the received signal is discarded. The overhead is typically 10-25%. Throughout, we will assume 20% (0.8 dB). It is possible, and in fact highly likely, that the CP is longer than is needed for a particular user's receiver to ensure that no interblock interference is experienced. For broadcast, the CP may be designed for the worst-case delay spread, which may not be experienced by all users in the coverage area. For cellular, if different tones are assigned to different users, then the CP needs to be designed for the user with the largest delay spread. The other users will end up with a CP longer than they need.

When the delay spread of the channel is less than the length of the CP, then part of the discarded received signal doesn't contain interference from the previous block. This "clear" portion of the CP could be used to recover more signal energy. Thus, the clear portion of the CP (CCP) as well as the data block is retained for further processing.

Recent work has focussed on applying a Nyquist window function to the retained signal as described in the publications "Improving an OFDM-reception by using an adaptive Nyquist windowing" by C. Muschalik, IEEE Trans., Consumer Electronics, vol. 42, pp. 259-269, August 1996 and "Optimum Nyquist Windowing in OFDM-receivers" by S. H. Müller-Weinfurtner, IEEE Trans. Commun., vol. 49, pp. 417-420, March 2001. In this work, the windowed data corresponding to the CCP is added to the corresponding end of the data block before performing an FFT. The main motivation for this was to suppress intertone interference caused by residual frequency offset. In "Improving an OFDM-reception by using an adaptive Nyquist windowing" by C. Muschalik, standard well known Nyquist windowing functions are applied. In "Optimum Nyquist Windowing in OFDM-receivers" by S. H. Müller-Weinfurtner, the Nyquist window is designed to minimize the sum of noise and intertone interference assuming a specific residual frequency offset.

Figure 1:
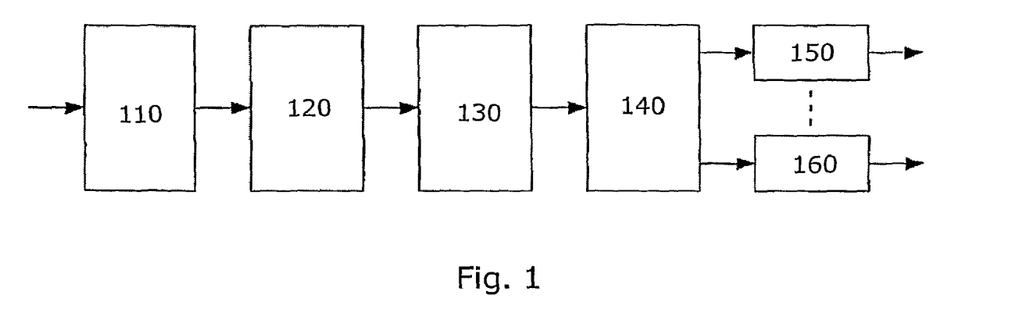
FIG. 1 illustrates an OFDM baseband processor according to prior art.

A block diagram based on "Optimum Nyquist Windowing in OFDM-receivers" by S. H. Müller-Weinfurtner, is given in FIG. 1. At step 110, useful samples corresponding to the data block and CCP are retained. A Nyquist window function is applied to the retained data at step 120. The CCP is then added to the end of the block at step 130. At step 140, an FFT is applied to the resulting data, providing detection statistics for each symbol. These are individually demodulated in steps 150-160. In this figure, a separate demodulator is depicted for the different frequencies at the output of the FFT at step 140 to emphasize that different frequencies can have different metrics etc. In practice, the output from the FFT at step 140 is typically read out serially, and there is only one demodulator block that is properly adjusted for that different frequencies experience different channel conditions.

The object of the invention is to provide a solution to some of the disadvantages with prior art.

SUMMARY OF THE INVENTION

This object is achieved by a method for recovering at least one OFDM (Orthogonal Frequency Division Multiplexed)—signal in a communication system, wherein the at least one OFDM-signal at least in part comprises recurring redundant information comprising the steps of:

a) extracting a set of useful samples from the at least one OFDM-signal that includes samples of recurring redundant information;

b) estimating at least one correlation matrix from the as least one OFDM-signal to produce at least one correlation matrix estimate;

c) processing the set of useful samples using said at least one correlation matrix estimate, to obtain symbol statistics from the extracted set of samples and;

d) recovering symbols from the symbol statistics.

in this fashion the method works without the constraint imposed when one uses Nyquist windowing on the extracted set of useful samples, that is zero intertone interference with zero carrier offset in the OFDM-signal.

The cyclic redundant information contained in the OFDM-signal described above is most likely to be a cyclic prefix (CP), but there may be situations where the OFDM-coded contains a cyclic suffix (CS) or both a CP and a CS. In general, cyclic redundant information is a form of recurring redundant information.

The processing operation described above may be performed by using a data correlation matrix Which may be constructed parametrically or non-parametrically, i.e. the correlation may be estimated from known channel parameter values or from the extracted useful samples themselves. It is also contemplated to perform the abovementioned processing operation by using impairment matrices associated with different tones and to use these matrices to form recovery sequences for the OFDM-signal.

In order to facilitate estimation of channel parameter values, the OFDM-signal may comprise pilot symbols which could be used to estimate the effective channel coefficients.

The present invention may be applied in a wireless communication network, which includes cellular communication networks, but also in wired communication networks, since problems of intertone interference appear in both types of networks.

In the case of application of the present invention to a wireless network, it is possible in the presence of a plurality of antennas on a receiver in the wireless network to perform the processing operation described above jointly over multiple receive antenna signals or separately for each of the OFDM-signals received on each antenna.

In one embodiment of the present inventive method the method may comprise performing a correlation operation between the recovery sequences for each tone in the OFDM-signal and the useful samples extracted from the OFDM-signal in order to obtain symbol statistics. This would present a relatively straightforward implementation of the present inventive method.

The recovery sequence for tone k may be for example be determined from an effective tone sequence and an impairment correlation matrix estimate, where the impairment correlation matrices are estimated using effective channel coefficient estimates.

Due to noise inherent in the receiver of the abovementioned communication network, apart from the noise in the communication channel through which the OFDM-signal is received, there may be some residual frequency offset left between a transmitter in the communication network above and the receiver, which should be compensated for. In the case that this residual frequency offset is not known, it may be approximated by a distribution, which in this particular case would translate to using a residual frequency distribution to estimate the impairment matrices.

It should also be noted that the abovementioned recovering of symbols from symbol statistics comprises computing symbol log-likelihoods using effective channel coefficient estimates and possible symbol values.

In the case that the signal is phase-encoded according to one of the methods of BPSK (Binary Phase Shift Keying), QPSK (Quaternary Phase Shift Keying) or 8-PSK (8-ary Phase Shift Keying) before being OFDM-encoded and transmitted, the log-likelihood mentioned above can be calculated by using effective channel coefficient estimates in order to recover symbols from said symbol statistics.

In one other embodiment of the present invention the method described in the beginning of this chapter may be modified to further comprise the steps of:

c1) performing a prefiltering operation on the set of useful data samples using said correlation matrix to produce prefiltered data c2) adding a portion of the recurring redundant information to each prefiltered data block obtained from step c1) to produce final data block and c3) performing an FFT (Fast Fourier Transform) on the final data block to obtain symbol statistics.

The data correlation matrix in this embodiment may be estimated from channel coefficient estimates or from the data itself using past and future data vectors.

It may also be added that step d) for a symbol k described above may further comprise multiplying the symbol statistic obtained in step d) by the conjugate of the effective channel coefficient.

Also, step d) for a symbol k may additionally comprise multiplying the symbol statistic obtained in step d) by a scaling factor a(k) that depends on an effective channel coefficient estimate.

In a third embodiment of the present invention, the inventive method may alternatively comprise the steps of:

a) extracting a set of useful samples from the at least one OFDM-signal;

b) estimating at least one channel coefficient from the at least one OFDM-signal to produce at least one channel coefficient estimate;

c) forming a real-valued weighting factor using said at least one channel coefficient estimate;

d) processing said set of useful samples using said weighting factor to produce symbol statistics, and e) recovering symbols from said symbol statistics.

One variant of the correlation operation mentioned earlier may be an FFT-operation. FFT is normally relatively simple to implement and can be calculated with low complexity.

Thus, even though this embodiment of the present invention contains more processing steps than the first two embodiments, this is compensated by that the steps are executed relatively rapidly.

The weighting factor in step c) may be determined from a signal quality that is computed using the at least one channel estimate.

Step e) above may also comprise multiplying said symbol statistics by a scaling factor a(k) that depends on said weighting factor. The scaling factor a(k) may also depend on a tone dependent interference level I_0(k).

The recovery of symbols in this third embodiment of the present invention may comprise forming symbol likelihoods using the already mentioned symbol statistics and symbol values.

In yet another embodiment of the present invention step d) described above may additionally comprise forming two data blocks using the set of useful samples extracted from the OFDM-signal. In this case the processing operation mentioned above would comprise performing a FFT-operation on each of these data blocks.

Also, the method may further comprise scaling a portion of the FFT-processed first data block by a first block factor and scaling a portion of the FFT-processed second data block by a second factor, where the block factors are determined from the weighting factors.

It should be pointed out that this weighting factor may be different for each tone of the OFDM-signal and may be determined from a ratio of interference and noise powers.

Since one of the objectives of the present invention is to maximize the SINR for the received OFDM-signal one may also design the weighting factor for this purpose.

Additionally, in this embodiment of the present invention, step e) described above may comprise scaling the symbol statistics by the conjugate of the effective channel coefficient.

Also, the result in step e) may be additionally scaled by a factor a(k), where a(k) is determined by said weighting factor for good soft information.

In another aspect of the invention, the object above is achieved by means of a baseband demodulation processor for recovering at least one OFDM-signal where the at least one OFDM-signal at least in part comprises recurring redundant information and wherein the baseband demodulation processor comprises a first unit for extraction of a set of useful samples from the at least one OFDM-signal, a second unit for estimating at least one channel coefficient from the at least one OFDM-signal, where the second unit is adapted to produce at least one channel coefficient estimate from the at least one OFDM-signal, wherein the baseband demodulation processor further comprises a third unit for processing the set of useful samples using a real-valued weighting factor obtained from the at least one channel coefficient estimate, where the third unit is adapted to obtain symbol statistics from the extracted set of samples and wherein the baseband demodulation processor further comprises a fourth unit for recovering symbols from the symbol statistics.

The baseband demodulation processor is especially adapted to implement the steps of the different embodiments of the method according to the present invention.

According to yet another aspect of the present invention, the object of the invention is achieved by a receiver for receiving at least one OFDM-signal where the at least one OFDM-signal at least in part comprises recurring redundant information, where the receiver comprises a portion for mixing the received OFDM-coded signal to a lower frequency and for sampling the thus mixed signal and where the receiver further comprises a demodulator for receiving the mixed and sampled OFDM-coded signal, wherein the demodulator comprises a first unit for extraction of a set of useful samples from the at least one OFDM-signal; a second unit for estimating at least one channel coefficient from the as least one OFDM-signal, where the second unit is adapted to produce at least one channel coefficient estimate from the at least one OFDM-signal; wherein the demodulator further comprises a third unit for processing the set of useful samples using a real-valued weighting factor that depends on said at least one channel coefficient estimate, where the third unit is adapted to obtain symbol statistics from the extracted set of samples and wherein the demodulator further comprises a fourth unit for recovering symbols from the symbol statistics.

According to yet another aspect of the present invention, the object of the invention is achieved by a communication system for sending and receiving OFDM (Orthogonal Frequency Multiplexed)-signals, where the signals comprise recurring redundant information and where the communication system comprises a transmitter for transmitting said OFDM-signal comprising recurrent redundant information and a receiver for receiving at least one OFDM-signal, wherein the receiver comprises a portion for mixing the received OFDM-coded signal to a lower frequency and for sampling the thus mixed signal, where the receiver further comprises a demodulator for receiving the mixed and sampled OFDM-coded signal, wherein the demodulator comprises a first unit for extraction of a set of useful samples from the at least one OFDM-signal; a second unit for estimating at least one channel coefficient from the as least one OFDM-signal, where the second unit is adapted to produce at least one channel coefficient estimate from the at least one OFDM-signal, wherein the demodulator further comprises a third unit for processing this set of useful samples using a real-valued weighting factor determined from said at least one channel coefficient estimate, where the third unit is adapted to obtain symbol statistics from the extracted set of samples and wherein the demodulator further comprises a fourth unit for recovering symbols from the symbol statistics.

Finally, in yet another aspect of the present invention, the object of the invention is achieved by a computer program for processing at least one OFDM (Orthogonal Frequency Multiplexed)-signal, wherein the signal contains recurring redundant information and where the computer program comprises instruction sets for:
a) extracting a set of useful samples from the at least one OFDM-signal;
b) estimating at least one channel coefficient from the as least one OFDM-signal to produce at least one channel coefficient estimate;
c) processing this set of useful samples using a real-valued weighting factor determined from said at least one channel coefficient estimate to obtain symbol statistics from the extracted set of samples and;
d) recovering symbols from the symbol statistics.

It is worth mentioning that the computer program is specially adapted to execute the method steps described in the different embodiments of the method according to the present inventions and to be implemented in the above baseband processor. This program may either be located on an external memory or memory device or in an internal memory associated with the baseband processor.

SHORT DESCRIPTION OF THE DRAWINGS

In the following, the invention itself and the resulting advantages will be more clearly understood by referring to specific embodiments of the invention explained with reference to the accompanying drawings.

DETAILED DESCRIPTION OF THE PREFERRED EMBODIMENTS

To describe the invention, it will help to think of OFDM as a form of code division multiplexing (CDM), in which the spreading codes of OFDM correspond to the columns of the IFFT in matrix form. For example, for the case of four tones, the tones can be represented by 4-chip sequences as shown in Table 1 (as column vectors).

TABLE 1

Example of 4-chip tones.

| Tone | Sequence | | | |
|---|---|---|---|---|
| 1 | 1 | 1 | 1 | 1 |
| 2 | 1 | j | −1 | −j |
| 3 | 1 | −1 | 1 | −1 |
| 4 | 1 | −j | −1 | j |

Figure 2:
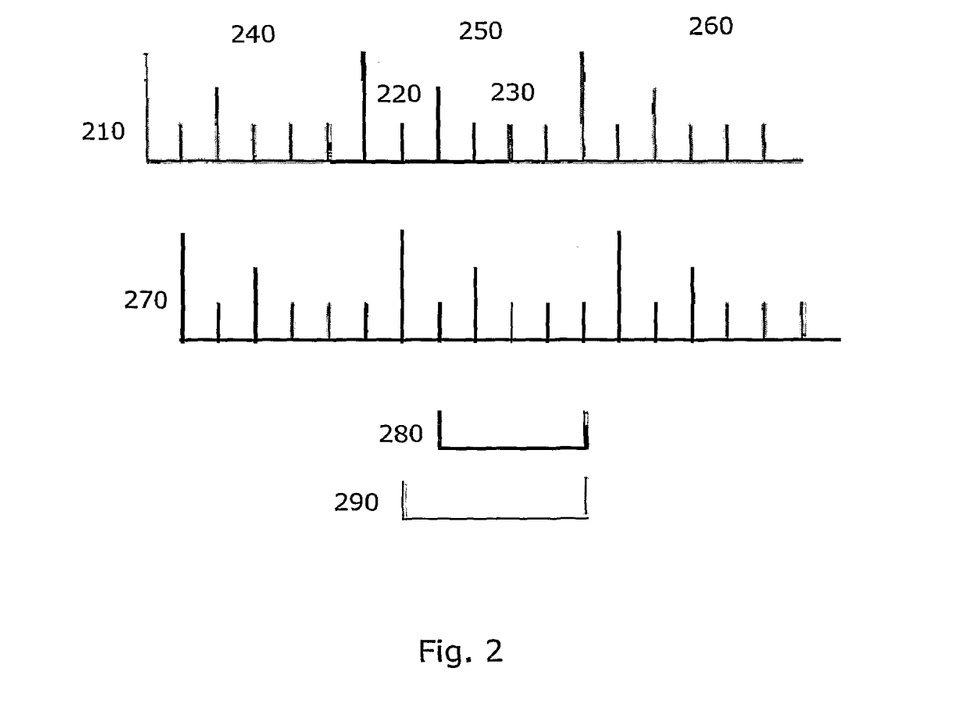
FIG. 2 shows an example of received OFDM-signal images.

Consider a simple example in which 4-chip tones are used and the length of the cyclic prefix is 2 chips. Thus, copies of the last two chips are pre-appended. Suppose the channel can be modeled by two paths, path0 210 and path1 270, with relative path delay of one chip and channel coefficients $c(0)$ and $c(1)$. This is shown in FIG. 2, where an example OFDM-signal contains three data blocks, block 0 240, block 1 250 and block 2 260 and where each block comprises a cyclic prefix CP 220. Here, the focus is on demodulating block 1 250. Traditional reception would discard all of the CP 220 corresponding to path 0, whereas the present invention keeps one chip of the CP 220 such that block 0 doesn't interfere.

The remaining data block after the discarding operation is illustrated as 280 for a data block according to prior art and as 290 for a data block containing the remaining CP.

In this example, with the recycling approach, 1 chip of the CP 220 is discarded and 1 chip of the CP 220 is kept (the CCP is 1 chip). Thus, 5 chips are processed further. We can think of the signal, including the CCP, as using 5-chip extended sequences, shown in Table 2.

The difference in length (1 chip in this case) between the traditional 280 signal after processing in the receiver and the signal with CCP 290 is also shown in FIG. 2.

Now, returning to Table 2, we will denote these recycled signals as column vectors f(k). We can collect these vectors into a matrix F.

TABLE 2

Example of extended 4-chip tones.

| Tone | | Sequence | | | |
|---|---|---|---|---|---|
| 1 | (1) | 1 | 1 | 1 | 1 |
| 2 | (−j) | 1 | j | −1 | −j |
| 3 | (−1) | 1 | −1 | 1 | −1 |
| 4 | (j) | 1 | −j | −1 | j |

The 5-chip received vector r can be modeled as $$r = h(1)f(1)s(1) + h(2)f(2)s(2) + h(3)f(3)s(3) + h(4)f(4)s(4) + n,$$

where h(k) is an effective channel coefficient, different for each tone k, in general, s(k) is the transmitted symbol on tone k, and n is a noise vector.

These complex channel coefficients would be estimated using known techniques. For example, by transmitting known pilot symbols embedded in the data. Also, the noise covariance N would be estimated using known techniques. If the noise is assumed white, then N is an identity matrix times a noise power (N_0) and only the noise power needs to be estimated.

In the following, different embodiments of the present invention will be explained.

It should also be pointed out, that although these embodiments describe method steps according to the present invention, these steps may equally be performed by a baseband demodulation processor, where different units in the baseband demodulation processor are performing the steps depicted by the reference numbers in FIGS. 3-6.

Embodiment 1

Figure 3:
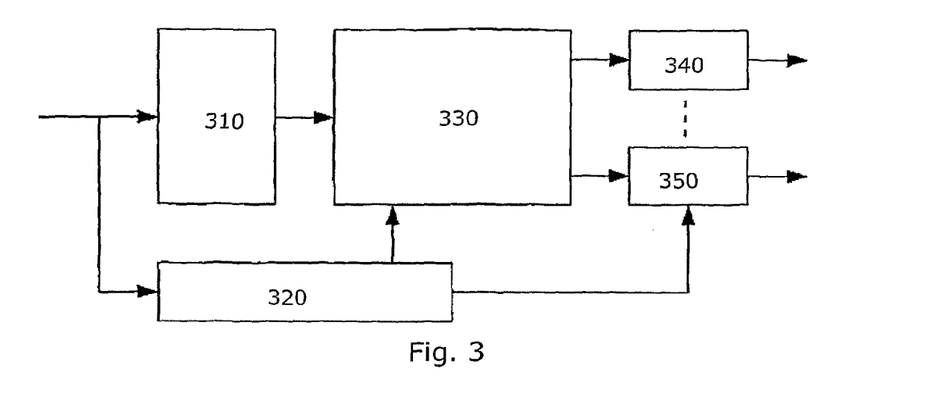
FIG. 3 illustrates a first embodiment of the inventive method, where a recovery sequence is applied to each signal tone separately.

The first embodiment, shown in FIG. 3, is a straightforward implementation of a ML (Maximum Likelihood) approach. In the first step 310 a set of useful data samples are extracted from a received OFDM-signal. For each tone, a recovery sequence is determined at step 320. The received data is then correlated to the conjugate of the set of recovery sequences in order to provide symbol statistics at step 330. These statistics are then demodulated in steps 340-350 to recover the symbols.

For tone k, the recovery sequence (column vector form) is given by w(k)=inv(M(k))h(k)f(k),
where inv(M(k)) denotes the inverse of matrix M(k). Matrix M(k) is the impairment (noise+intertone interference) correlation or covariance matrix. For tone 1, it is given by $M(1) = N + |h(2)|^2 * f(2) * f^H(2) + |h(3)|^2 * f(3) * f^H(3) + |h(4)|^2 * f(4) * f^H(4),$
where superscript "H" denotes Hermitian transpose. In general, M(k) is the sum of the noise covariance N and the interference due to the other tones. Depending on receiver design, there may be residual frequency offset present. If the residual offset were known, then the data vector could be compensated to remove it. Here we consider the case where it is unknown. In this case, the $f(k)*f^H(k)$ terms that form M(1) can be replaced with average terms corresponding to averaging over a distribution of frequency offset.

For example, let $f(k)=[f1\ f2\ f3\ f4\ f5]^T$, where superscript "T" denotes transpose. A residual offset of b radians per chip period would give the impaired value $[f1\ f2e\ f3e^2\ f4e^3\ f5e^4]^T$, where e=exp(jb). Thus, the impaired term would be different.

In essence, one can assume a distribution of residual frequency offset and pre-compute the average of these outer product terms. These can be used to compute M(k).

The decision statistic is then given by $z(k) = w^H(k)*r$, where w(k) is a recovery sequence in column vector form.

The associated SINR is given by $$SINR(k) = w^H(k)*h(k)*f(k).$$

Note that in practice h(k) may be omitted from forming the recovery sequence and the conjugate of h(k) can be applied later in the demodulation process, which is normally where it is applied. The approach can also be used with multiple receive antennas. In this case, the received samples from different antennas are stacked to obtain a longer r vector.

This vector can be modeled as $$r = H(1)*f(1)*s(1) + H(2)*f(2)*s(2) + H(4)*f(4)*s(4) + H(4)*f(4)*s(4) + n,$$

where H(k) is a vector given by $$H(k) = [h(k,1)^T h(k,2)^T]^T$$

where superscript "T" denotes transpose and h(k,1) is the effective channel coefficient for tone k on antenna 1.

The recovery sequence is given by $$w(k) = inv(M(k))*H(k)*f(k), \text{ where, for tone 1,}$$

$$M(1) = N + H(2)*f(2)*f^H(2)*H^H(2) + H(3)*f(3)*f^H(3)*H^H(3) + H(3)*f(3)*f^H(3)*H^H(3)$$

The SINR is given by $$SINR(k) = w^H(k)*H(k)*f(k).$$

Demodulation depends on the modulation used. In general, the log-likelihood that a particular symbol s(k) is equal to a certain symbol value S(m) is given by $$LL\{s(k)=S(m)\} = 2Re\{s*(m)z(k)\} - S(m)|^2 SINR(k),$$

where superscript "*" denotes complex conjugate. These log-likelihoods can be used in known ways to form a variety of demodulation outputs, such as soft information in the form of bit log-likelihood ratios for FEC decoding. In the case of constant amplitude symbols (BPSK, QPSK, 8-PSK), the second term can be dropped. For standard FEC decoders, the factor of 2 can also be removed. For BPSK and QPSK modulation, the log-likelihood ratio (LLR) can be determined directly from z(k).

For example, for BPSK, the LLR is given by $$LLR(k) = 4Re\{z(k)\}.$$

The factor of 4 may be omitted with most FEC decoders.

While this embodiment improves performance, it is more complex than the prior art as the efficient parallel correlation provided by the FFT has been lost. This motivates the second embodiment, which is equivalent to the first in performance but allows for the use of an FFT.

Embodiment 2

Figure 4:
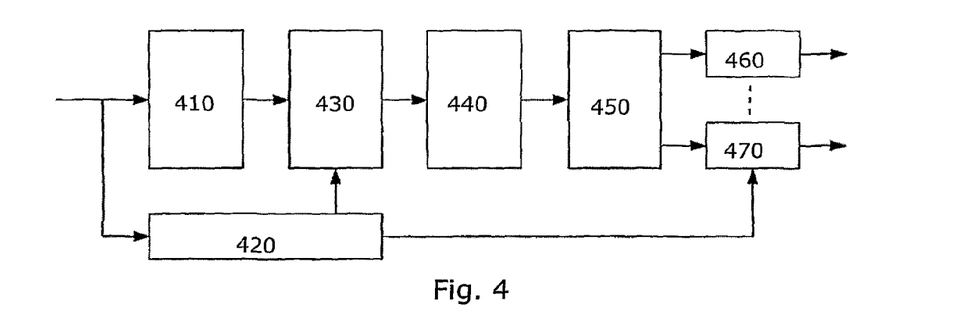
FIG. 4 illustrates a second embodiment of the inventive method where a matrix prefilter is applied to the extracted data vector.

The second embodiment is an efficient implementation of the ML approach. It is shown in FIG. 4. Analogously to step 310 for embodiment 3 of the present invention, useful data samples from the received OFDM-signal are extracted at step 410. A pre-filter matrix and other quantities needed for symbol recovery are estimated at step 420. Next, at step 430, a matrix pre-filter is applied to a set of useful data samples extracted at step 410. Thus, the data vector r is multiplied by the inverse of the matrix P. Ideally, the matrix P should be the correlation matrix associated with the data vector. This can be estimated non-parametrically from the data itself, using past and possibly future data vectors. Specifically, the outer product $r\, r^H$ is formed for different blocks and averaged, possibly with tapering as in exponential smoothing.

Matrix P can also be estimated parametrically using the channel coefficients, the noise covariance, and the extended sequences. Specifically, for one receive antenna, $$P=N+|h(1)|^2 *f(1)*f^H(1)+|h(2)|^2*f(2)*f^H(2)+ |h(3)|^2*f(3)*f^H(3)+|h(4)|^2*f(4)*f^H(4)$$

Note that this can be formed using the RLS algorithm, initializing using the inverse of N then performing 4 updates. Like the previous embodiment, the outer products can be replaced with average values, averaged over possible residual frequency offset.

In practice, P does not have to be inverted. For example, one can solve y=Pr using Gauss-Seidel or Gauss-Jordan iterative approaches. Any approach for solving such a set of equations can be used.

The filtered vector is then provided to an FFT at step 450 to form symbol detection statistics. For symbol k, the demodulator multiplies the decision statistic by the conjugate of h(k). Optionally, for better soft information, it will multiply by a scaling factor a(k), where $$a(k)=1/[1-h^*(k)*f^H(k)*v(k)]$$

$$v(k)=\mathrm{inv}(P)*h(k)*f(k).$$

For multiple receive antennas, matrix P can be formed parametrically using $$P=N+H(1)*f(1)*f^H(1)*H^H(1)+H(2)*f(2)*f^H(2)* H^H(2)+H(3)*f(3)*f^H(3)*H^H(3)+H(4)*f(4)* f^H(4)*H^H(4)$$

Embodiment 3

Figure 5:
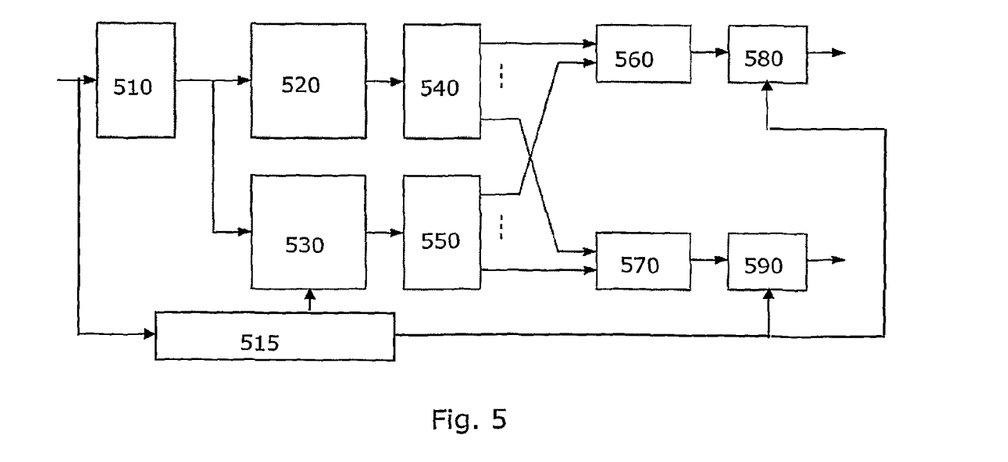
FIG. 5 illustrates a third embodiment of the inventive method where two FFT and scaling operations are performed on the received OFDM-signal.

In this embodiment, the complexity of the matrix pre-filter is removed. In its place, two FFT operations are required instead of one. An approximation to the ML solution results that is intended for use when the noise is white (N=N_0 I). The embodiment is shown in FIG. 5. Step 510 is analogous to the previously described steps 310 and 410. At step 515, weighting factors and parameters needed for signal recovery are estimated. At steps 520 and 530, two data sets are formed, and each is passed through an FFT at steps 540 and 550. The first set is obtained by simply adding the CCP to the end of the data block (step 520), whereas the second set is obtained by adding the CCP to the end of the data block and scaling this portion by ½ (step 530). Note that the scaling by ½ can occur before the adding (window then add) or after adding. For each symbol k, the two FFT outputs are combined in an interpolative way at steps 560 and 570 using the weighting factors rho(k), where these weighting factors may be real valued numbers. Specifically, the FFT output corresponding to first data set (first FFT) is weighted by 1-beta(k) and the second FFT output corresponding to the second data set is weighted by beta(k), where beta(k)=2(1−rho(k)).

The weighting factor rho(k) is potentially different for each tone and is adaptive. It is designed to maximize SINR. It is given by $$\mathrm{rho}(k)=(1+K\mathrm{gamma}(k))/(1+2K\mathrm{gamma}(k))$$

where K is the number of tones (4 in our example) and gamma(k)=[1/(L(K−L)) I_O(k)/N_O,
where N_0 denotes noise power and L is the length of the CCP in chips. The term I_0(k) is a tone-dependent interference level. For tone 1 and one receive antenna, it is given by $$I\_0(1)=|h(2)|^2|f^H(1)f(2)|^2+|h(3)|^2|f^H(1)f(3)|^2+ |h(4)|^2|f^H(1)f(4)|^2$$

In general, it is a sum of terms corresponding to the interfering tones. Note, to compensate for residual offset, terms of the form $|f^H(1)f(3)|^2$ can be replaced with averages, averaged over a nominal frequency offset distribution.

For two receive antennas, I_0(k) is given by $$I\_0(1)=\mathrm{sum}/(|h(1,1)|^2+|h(1,2)|^2),\ \text{where}$$

$$\mathrm{sum}=|h*(1,1)h(2,1)+h*(1,2)h(2,2)|^2$$

$$|f^H(1)f(2)|^2 ++|h*(1,1)h(3,1)+h*(1,2)h(3,2)|^2$$

$$|f^H(1)f(3)|^2 ++|h*(1,1)h(4,1)+h*(1.2)h(4.2)|^2|f^H(1)f(4)|^2.$$

Unknown frequency offset can be handled similar to the one antenna case.

In the demodulator, scaling by the conjugate of h(k) divided by N_0 is performed at steps 580 and 590. Optionally, scaling by a(k) for good soft information is performed, where a(k) for this embodiment is given by $$a(k)=\mathrm{num}/\mathrm{denom}$$

where $$\mathrm{num}=K+(2\mathrm{rho}(k)-1)L$$

$$\mathrm{denom}=K+(2\mathrm{rho}(k)^2-1)L+(2\mathrm{rho}(k)-1)^2 I\_0(k)/N\_0$$

This gives the decision statistic z(k).

Embodiment 4

Figure 6:
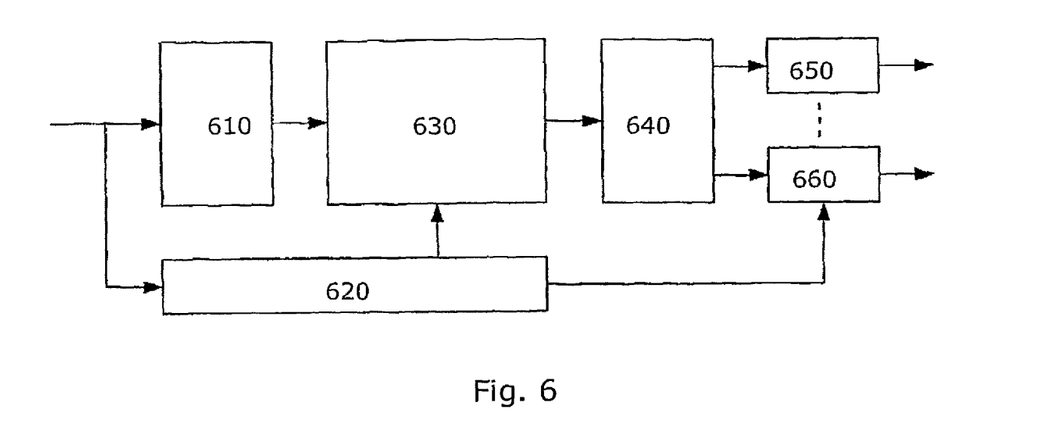
FIG. 6 illustrates a fourth embodiment of the inventive method where only one FFT and scaling operation is performed on the received OFDM-signal.

In this embodiment, the same weighting factor rho is effectively used for all tones and may be a real-valued number. This allows one FFT to be used instead of two. If rho=½ (high SNR), then a Nyquist window results as described in "Optimum Nyquist Windowing in OFDM-receivers" by S. H. Müller-Weinfurtner. However, unlike in the prior art disclosed by the document above, the rho value is adapted to the signal quality in some way. When rho is not ½, the effective window is not Nyquist.

To obtain a single rho, I_0(k) is replaced with its average value, which is determined by approximating products of effective channel coefficients with averages.

This gives $$\mathrm{rho}(k)=\mathrm{rho}=(1+Kg)/(1+2\ Kg)$$

where, for one receive antenna, $$g=S\_c/N\_0$$

$$S\_c=\text{chip signal power}=E\_c(|c(0)|2+|c(1)|2),$$

where E_c is the energy per chip per tone of the transmitted signal. In practice, channel estimates would be related to sqrt(E_c) c(k) in a known way. For example, the channel estimates may be proportional to sqrt(E_c) c(k), so that separate estimation of E_c is not needed. Note that g is a signal quality measure in that it is the ratio of a signal power to a noise power.

For two receive antennas, g is given by $$g=[\mathrm{phi}\ S\_c(1)+(1-\mathrm{phi})S\_c(2)]/N\_0$$

$$\mathrm{phi}=S\_c(1)/(S\_c(1)+S\_c(2))$$

which is equivalent to $$g=[S\_c^2(1)+S\_c^2(2)]/[N\_0(S\_c(1)+S\_c(2))]$$

where the index on S_c refers to which antenna.

The embodiment is shown in FIG. 6. From the useful samples obtained at step 610, the CCP is added to the end of the data block, and this sum is scaled by rho at step 630.

At step 620, parameter estimates are formed for signal recovery, including determined the CCP length and channel coefficient estimation.

At step 640, an FFT is performed followed by demodulation per symbol. In the demodulators, the decision statistic is scaled by the conjugate of h(k)/N_0 as well as a(k) at steps 650-660.

For a(k), one can use the expression for embodiment 3. However, it makes sense to replace I_0(k) by its average value, given by $$\text{avg}(I\_0(k)) = L(K-L)N\_0 \text{ g}$$

Higher Order Modulation with Embodiments 3 and 4.

With embodiments 3 and 4, a symbol log-likelihood can be expressed as $$LL\{s(k)=S(m)\}=2\text{Re}\{s^*(m)z(k)\}-|S(m)|^2 \text{SINR}(k)$$

where z(k) is the decision statistic and SINR(k) for these embodiments is given by $$\text{SINR}(k)=\text{num}/\text{denom}$$

$$\text{num}=[K+(2\text{rho}(k)-1)L]^2[|h(k,1)|^2+|h(k,2)|^2]$$

$$\text{denom}=K+(2\text{rho}(k)^2-1)LN\_0+(2\text{rho}(k)-1)^2 I\_0(k)$$

For embodiment 4, rho(k) is the same for all tones. It is convenient to replace I_0(k) with its value averaged over tones. Note that S(m) corresponds to different symbol values.

Receiver Context

Figure 7:
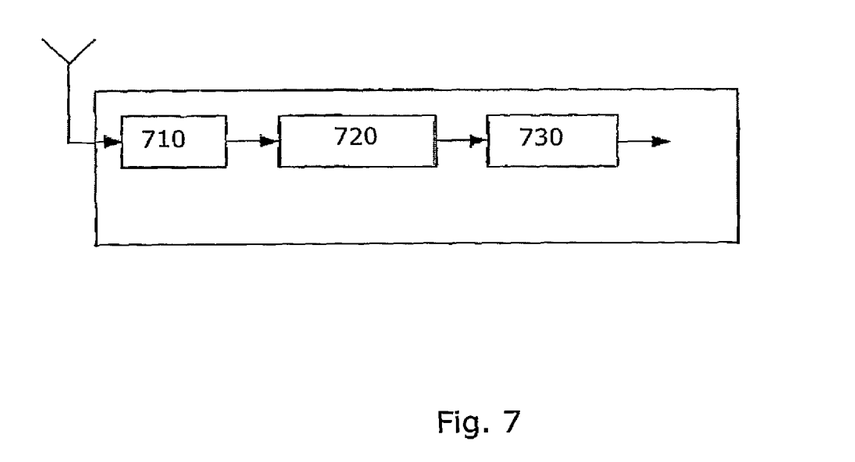
FIG. 7 shows a receiver according to the present invention.

While the focus has been on a baseband demodulation processing method, the invention resides in the demodulator portion of the receiver which can for example be a baseband demodulation processor located inside an OFDM receiver (wired or wireless). An example of a wireless receiver, for cellular, WLAN, or other use, is shown in FIG. 7.

The receiver comprises a front end 710 which provides mixing down to baseband and sampling, a demodulator 720 for processing the received OFDM-signal received from the front end 710 and for demodulating the OFDM-signal. Further, the receiver comprises a post processor 730 which can include FEC decoding.

Preferred embodiments when using multiple receive antennas have been given. Alternatively, the invention can be applied separately on each antenna signal and the results added together to form final soft values. Instead of simply adding the results together, combining weights can be applied using standard array processing to combine the antenna signals to account for both signal (h(k) per antenna) and noise (a 2×2 noise covariance in space). The latter can be estimated adaptively using known symbols in standard ways. The invention has been described with respect to a cyclic prefix. In some systems there is both a cyclic prefix and cyclic suffix. This simply changes how the f vectors are formed, pre-appending and post-appending the tone chip values instead of just pre-appending.

It should be noted, however, that these embodiments are meant for illustration purposes only and should not be interpreted as limiting the invention. For the skilled person it should be clear that various modifications of the invention are possible within the scope of the protection conferred by the accompanying claims.

ABBREVIATIONS

CP cyclic prefix
CCP clear portion of cyclic prefix
CDM code division multiplexing
FEC forward error correction
FFT fast Fourier transform
IF FT inverse fast Fourier transform
OFDM orthogonal frequency division multiplexing
ML maximum likelihood
RLS recursive least squares
SINR signal-to-interference-plus-noise ratio
SNR signal-to-noise ratio

The invention claimed is:

1. A method of recovering at least one Orthogonal Frequency Division Multiplexed (OFDM) signal in a communication system, wherein said at least one OFDM-signal includes recurring redundant information, said method comprising the steps of:
 a) extracting a set of useful samples from the at least one OFDM-signal, the set including samples of recurring redundant information;
 b) producing at least one correlation matrix estimate from the at least one OFDM-signal;
 c) processing said set of useful samples using said at least one correlation matrix estimate to obtain symbol statistics from the extracted set of samples, wherein the processing step includes:
  c1) utilizing impairment matrices associated with different tones to form recovery sequences, wherein the recovery sequence for a tone k is determined from an effective tone sequence and an impairment correlation matrix which is estimated utilizing a residual frequency offset distribution; and
  c2) performing a correlation operation between the recovery sequences and the useful samples extracted from the OFDM-signal in order to obtain the symbol statistics; and
 d) recovering OFDM symbols from said symbol statistics.

2. The method according to claim 1, wherein said recurring redundant information comprises a cyclic prefix (CP), a cyclic suffix (CS), or both a CP and a CS.

3. The method according to claim 1 wherein said communication network is a wireless or wired communication network.

4. The method according to claim 1 wherein said processing is performed jointly over multiple receive antenna signals or separately for each of the OFDM-signals received on each antenna.

5. A method of recovering at least one Orthogonal Frequency Division Multiplexed (OFDM) signal in a communication system, wherein said at least one OFDM-signal includes recurring redundant information, said method comprising the steps of:
 a) extracting a set of useful samples from the at least one OFDM-signal, the set including samples of recurring redundant information;
 b) producing at least one correlation matrix estimate from the at least one OFDM-signal;
 c) processing the set of useful samples using the at least one correlation matrix estimate to obtain symbol statistics from the extracted set of samples, wherein the processing step is performed by using a data correlation matrix constructed from estimated channel parameter values or from the extracted useful samples, the processing step including:
  c1) performing a prefiltering operation on said set of useful data samples using said data correlation matrix to produce prefiltered data blocks;
  c2) adding a portion of said recurring redundant information to each prefiltered data block obtained from step c1) to produce a final data block; and c3) performing a Fast Fourier Transform (FFT) on said final data block to obtain the symbol statistics; and d) recovering OFDM symbols from the symbol statistics.

6. The method according to claim 5, wherein said data correlation matrix is estimated using channel coefficient estimates.

7. The method according to claim 5, wherein said data correlation matrix is estimated by using past data vectors.

8. A baseband demodulation processor for recovering at least one Orthogonal Frequency Division Multiplexed (OFDM) signal, wherein the at least one OFDM-signal includes recurring redundant information, wherein the baseband demodulation processor comprises:
a first unit configured to extract a set of useful samples from the at least one OFDM-signal, the set including samples of recurring redundant information;
a second unit configured to produce at least one correlation matrix estimate from the at least one OFDM-signal;
a third unit configured to process the set of useful samples using the at least one correlation matrix estimate to obtain symbol statistics from the extracted set of samples, wherein the third unit is configured to:
utilize impairment matrices associated with different tones to form recovery sequences, wherein the recovery sequence for a tone k is determined from an effective tone sequence and an impairment correlation matrix which is estimated utilizing a residual frequency offset distribution; and
perform a correlation operation between the recovery sequences and the useful samples extracted from the OFDM-signal in order to obtain the symbol statistics; and
a fourth unit configured to recover OFDM symbols from the symbol statistics.

9. A baseband demodulation processor for recovering at least one Orthogonal Frequency Division Multiplexed (OFDM) signal, wherein the at least one OFDM-signal includes recurring redundant information, wherein the baseband demodulation processor comprises:
a first unit configured to extract a set of useful samples from the at least one OFDM-signal, the set including samples of recurring redundant information;
a second unit configured to produce at least one correlation matrix estimate from the at least one OFDM-signal;
a third unit configured to process the set of useful samples using the at least one correlation matrix estimate to obtain symbol statistics from the extracted set of samples, wherein the set of useful samples are processed utilizing a data correlation matrix constructed from estimated channel parameter values or from the extracted useful samples, wherein the third unit is configured to:
perform a prefiltering operation on the set of useful samples using the data correlation matrix to produce prefiltered data blocks;
add a portion of the recurring redundant information to each prefiltered data block to produce a final data block; and
perform a Fast Fourier Transform (FFT) on the final data block to obtain the symbol statistics; and
a fourth unit configured to recover OFDM symbols from the symbol statistics.

10. A receiver for receiving at least one Orthogonal Frequency Division Multiplexed (OFDM) signal where said at least one OFDM-signal includes recurring redundant information, where said receiver comprises:
a mixing and sampling unit for mixing the received OFDM-coded signal to a lower frequency and for sampling the mixed signal; and
a demodulator connected to the mixing and sampling unit for processing the mixed and sampled OFDM-coded signal, wherein the demodulator comprises:
a first unit configured to extract a set of useful samples from the at least one OFDM-signal, the set including samples of recurring redundant information;
a second unit configured to produce at least one correlation matrix estimate from the at least one OFDM-signal;
a third unit configured to process the set of useful samples using the at least one correlation matrix estimate to obtain symbol statistics from the extracted set of samples, wherein the third unit is configured to:
utilize impairment matrices associated with different tones to form recovery sequences, wherein the recovery sequence for a tone k is determined from an effective tone sequence and an impairment correlation matrix which is estimated utilizing a residual frequency offset distribution; and
perform a correlation operation between the recovery sequences and the useful samples extracted from the OFDM-signal in order to obtain the symbol statistics; and
a fourth unit configured to recover OFDM symbols from the symbol statistics.

11. A computer program product comprising computer program instructions stored on a non-transitory memory coupled to a baseband demodulation processor in a radio receiver, wherein when the baseband demodulation processor executes the computer program instructions, the receiver is caused to process at least one Orthogonal Frequency Division Multiplexed (OFDM) signal containing recurring redundant information by performing the steps of:

a) extracting a set of useful samples from the at least one OFDM-signal, the set including samples of recurring redundant information;

b) producing at least one correlation matrix estimate from the at least one OFDM-signal;

c) processing said set of useful samples using said at least one correlation matrix estimate to obtain symbol statistics from the extracted set of samples, wherein the processing step includes:
c1) utilizing impairment matrices associated with different tones to form recovery sequences, wherein the recovery sequence for a tone k is determined from an effective tone sequence and an impairment correlation matrix which is estimated utilizing a residual frequency offset distribution; and
c2) performing a correlation operation between the recovery sequences and the useful samples extracted from the OFDM-signal in order to obtain the symbol statistics; and d) recovering OFDM symbols from the symbol statistics.

* * * * *

UNITED STATES PATENT AND TRADEMARK OFFICE
CERTIFICATE OF CORRECTION

PATENT NO. : 8,179,988 B2
APPLICATION NO. : 12/278186
DATED : May 15, 2012
INVENTOR(S) : Bottomley et al.

It is certified that error appears in the above-identified patent and that said Letters Patent is hereby corrected as shown below:

In Column 2, Line 38, delete "in" and insert -- In --, therefor.

In Column 2, Line 49, delete "matrix" and insert -- matrix, --, therefor.

In Column 2, Line 49, delete "Which" and insert -- which --, therefor.

In Column 5, Lines 22-23, delete "(Orthogonal Frequency Multiplexed)" and insert -- (Orthogonal Frequency Division Multiplexed) --, therefor.

In Column 5, Lines 47-48, delete "(Orthogonal Frequency Multiplexed)" and insert -- (Orthogonal Frequency Division Multiplexed) --, therefor.

In Column 8, Line 35, delete "S(m)|$^2$" and insert -- $|S(m)|^2$ --, therefor.

In Column 9, Line 62, delete "I_O(k)/N_O," and insert -- I_0(k)/N_0, --, therefor.

In Column 9, Line 67, delete "f$^H$(1)f(4)|$^2$" and insert -- $|f^H(1)f(4)|^2$ --, therefor.

In Column 10, Lines 9-12, delete
"
sum = |h*(1,1)h(2,1) + h*(1,2)h(2,2)|²

|f$^H$(1)f(2)|² ++|h*(1,1)h(3,1) + h*(1,2)h(3,2)|²

|f$^H$(1)f(3)|² ++|h*(1,1)h(4,1) + h*(1,2)h(4,2)|²|f$^H$(1)f(4)|². " and insert --
sum = |h*(1,1)h(2,1) + h*(1,2)h(2,2)|² |f$^H$(1)f(2)|²
+ |h*(1,1)h(3,1) + h*(1,2)h(3,2)|² |f$^H$(1)f(3)|²
+ |h*(1,1)h(4,1) + h*(1,2)h(4,2)|² |f$^H$(1)f(4)|² .      --, therefor.

Signed and Sealed this
Eighteenth Day of September, 2012

David J. Kappos
*Director of the United States Patent and Trademark Office*